(12) United States Patent
Su et al.

(10) Patent No.: US 6,753,439 B2
(45) Date of Patent: Jun. 22, 2004

(54) FLAME-RETARDANT ACRYLOPHOSPHATE DERIVATIVES

(75) Inventors: Wen-Chiung Su, Taipei (TW); Ming-Te Shih, Taipei (TW)

(73) Assignee: Chung Shan Institute of Science & Technology, Taoyuan (TW)

(*) Notice: Subject to any disclaimer, the term of this patent is extended or adjusted under 35 U.S.C. 154(b) by 0 days.

(21) Appl. No.: 10/315,092

(22) Filed: Dec. 10, 2002

(65) Prior Publication Data

US 2004/0034172 A1 Feb. 19, 2004

(51) Int. Cl.$^7$ .................................................. C07F 9/09
(52) U.S. Cl. ....................................................... 558/156
(58) Field of Search .......................................... 558/156

(56) References Cited

U.S. PATENT DOCUMENTS 4,442,239 A * 4/1984 Tsunekawa et al. ......... 523/116
6,124,492 A * 9/2000 Su et al. ...................... 558/100

* cited by examiner

Primary Examiner—R Desai
Assistant Examiner—Robert Shiao
(74) Attorney, Agent, or Firm—Bacon & Thomas

(57) ABSTRACT

The present invention provides an acrylophosphate derivatives of the formula (I)

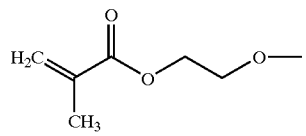

(I)

-continued

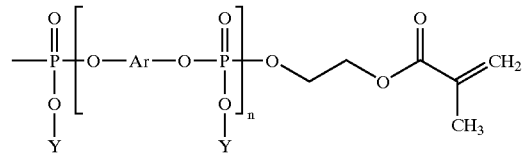

wherein $n \geq 1$; Ar is

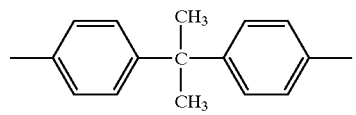

or

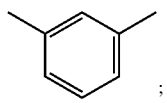

;

Y is

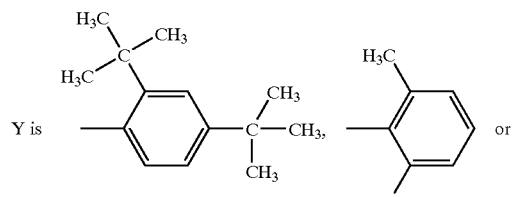
or

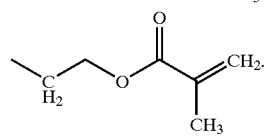

The acrylophosphate derivatives of formula (I) have high char residue test results by TGA.

7 Claims, No Drawings

FLAME-RETARDANT ACRYLOPHOSPHATE DERIVATIVES

BACKGROUND OF THE INVENTION

1. Field of the Invention

The present invention relates to a reaction type flame retardant and, more particularly, to an acrylophosphate derivatives.

2. Description of Related Art

Acrylophosphate flame-retardants are suitable for acrylic polymerization. The product retains its physical and chemical properties and can serve as a flame retardant.

Diphenyl-2-methacryloyloxyethyl phosphate is known as an acrylophosphate flame retardant. It has a high character residue test of 11% by TGA (Thermal Gravimetric Analyzer) at 600° C.

SUMMARY OF THE INVENTION

The object of the present invention is to provide a new series of acrylophosphate derivatives. The present invention provides an acrylophosphate derivatives of the formula (I)

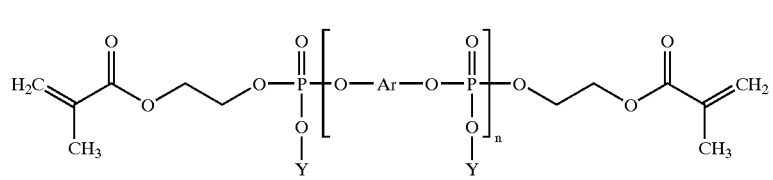

(I)

wherein
n≧1;
Ar is

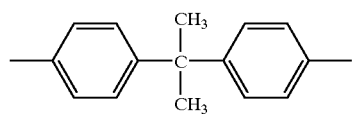

or

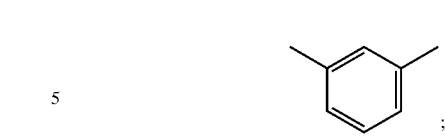

Y is 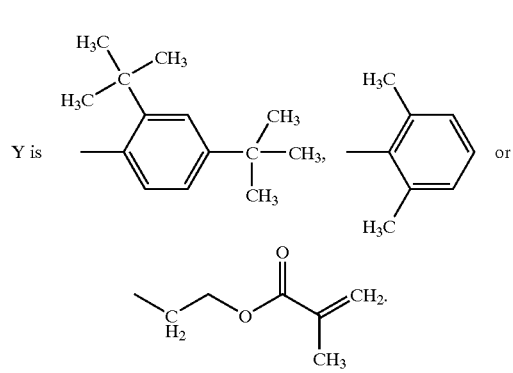

DETAILED DESCRIPTION OF THE PREFERRED EMBODIMENT

The formula (I) acrylophosphate derivatives can be prepared by the following Scheme 1 or Scheme 2.

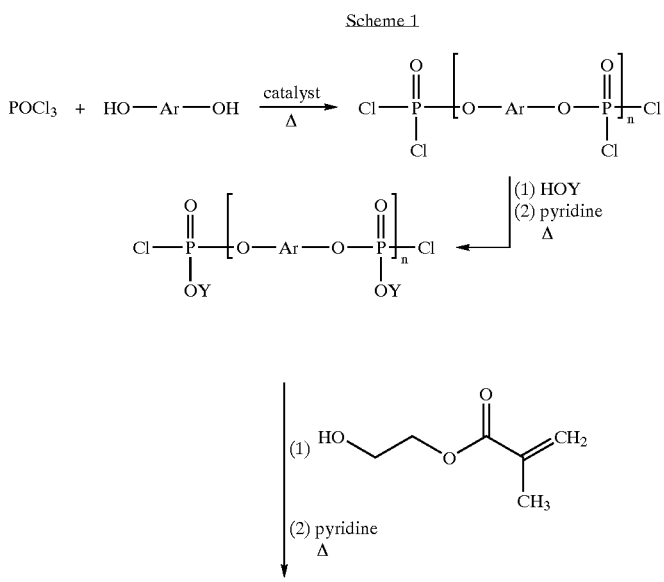

Scheme 1

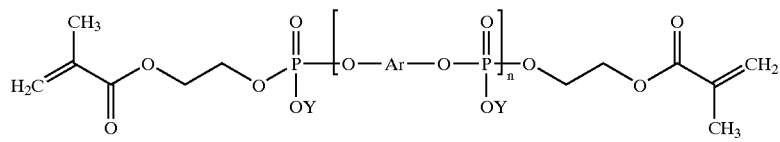

wherein n ≧ 1;

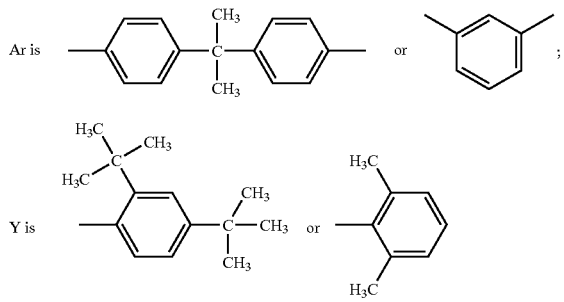

The Scheme 1 comprises the following steps:

(1) heating bisphenol A or resorcinol, excess phosphoryl chloride and a predetermined amount of magnesium chloride as catalyst for carrying out a first stage esterification reaction to yield a intermediate of formula (II):

$$Cl-\underset{\underset{Cl}{|}}{\overset{\overset{O}{\|}}{P}}-\left[O-Ar-O-\underset{\underset{Cl}{|}}{\overset{\overset{O}{\|}}{P}}\right]_n-Cl \quad (II)$$

wherein n≧1, and n=1 as a main product;

(2) distilling and recovering the un-reacted phosphoryl chloride, adding a predetermined amount of ortho-alkyl-phenolic compound and an organic base, and heating for carrying out a second stage esterification reaction;

(3) after the completion of the second stage esterification reaction, adding further a predetermined amount of an acrylic compound for carrying out a third stage esterification reaction;

These three stages of esterification reaction are analyzed by $^{31}P$ nuclear resonance spectroscopy for completing of reactions; and (4) after substantial completion of said third stage of esterification reaction, adding an organic solvent, filtering out the hydrochloride salt of organic base, converting residual hydrochloride salt into ammonium chloride with a predetermined amount of ammonia gas; filtering off said ammonium chloride, and evaporating off said organic solvent from the filtrate under reduced pressure to thereby obtain a acrylophosphate derivatives.

Scheme 2

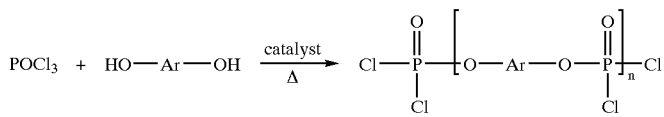

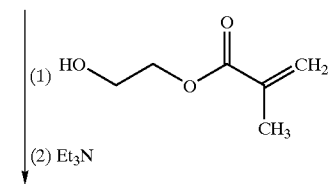

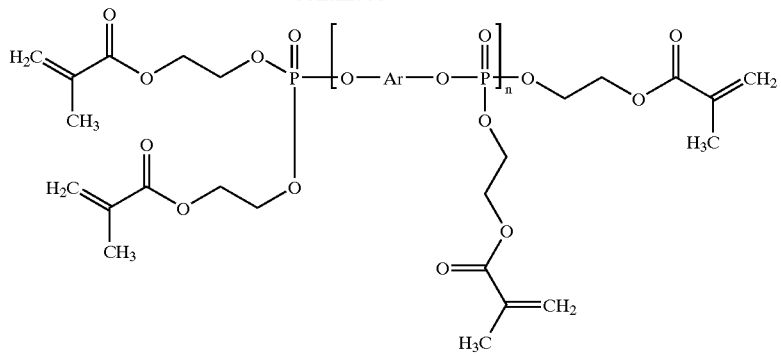

wherein n ≧ 1;

Ar is 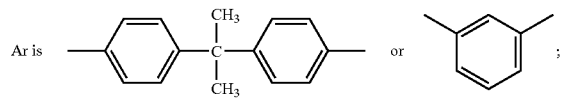

The Scheme 2 comprises the following steps:
(a) heating bisphenol A or resorcinol, excess phosphoryl chloride and a predetermined amount of magnesium chloride as catalyst for carrying out a first stage esterification reaction to yield a intermediate of formula (II):

$$Cl-\underset{\underset{Cl}{|}}{\overset{\overset{O}{\|}}{P}}-[O-Ar-O-\underset{\underset{Cl}{|}}{\overset{\overset{O}{\|}}{P}}]_n-Cl \quad (II)$$

wherein n≧1, and n=1 as a main product; and
(b) reacting said intermediate of formula (II) in step (a) with an acrylic compound, an organic base and an organic solvent to yield an acrylophosphate compound with four functional groups.

In the above two schemes, n is preferably 1, 2, or 3, and more preferably 1.

In the first stage of esterification reaction, the amount of said phosphoryl chloride is approximately 5 to 7 times by mole of said bisphenol A or resorcinol, and preferably 6 times; the amount of said magnesium chloride as the catalyst is approximately 0.1 to 1.0% by weight of said phosphoryl chloride, and preferably 0.4%; the organic base in step (2) is selected from the pyridine group, and the amount of said organic base is approximately 3 to 5 times by mole of said bisphenol A or resorcinol, and preferably 4 times; the amount of said ortho-alkyl-phenolic compound is approximately 1.8 to 2.0 times by mole of said bisphenol A or resorcinol; the amount of said acrylic compound added in step (3) is approximately 1.8 to 2.0 times by mole of said bisphenol A or resorcinol used in step (1); at least one of said organic solvents used in step (4) is selected from the group consisting of toluene, xylene, ethyl acetate, and butyl acetate; the organic base used in step (b) is triethylamine and its amount is 3.7 to 4.0 times by mole of said bisphenol A or resorcinol; and the amount of the acrylic compound used in step (b) is 3.7 to 4.0 times by mole of said bisphenol A or resorcinol; the organic solvent used in step (b) is selected from the group consisting of ether and dichloromethane.

The acrylophosphate derivatives of the present invention are prepared by a method with more detailed description: (1) Phosphoryl chloride, bisphenol A or resorcinol, and magnesium chloride were added to the reactor and heated at a temperature between 100~110° C. for four hours; excessive phosphoryl chloride was then distilled; (2) an ortho-alkylphenolic compound and an organic base were then added and heated at a temperature between 110~120° C. for one hour; (3) HEMA (2-hydroxyethylmethacrylate) was then added and heated at a temperature between 110~120° C. for another hour; all three stages of the esterification reaction were measured for completion by $^{31}$P nuclear resonance spectroscopy; (4) after dissolving the product compounds into organic solvents, the organic base salts were filtered out first, and then a small amount of ammonia gas was used to convert the residual organic base salts to ammonium chloride; the ammonium chloride was filtered out and then the organic solvents were distilled for the purpose of purification.

According to the present invention, the preparation of phosphate containing acrylic functional group was performed in an one-pot reactor. Bisphenol A or resorcinol, excessive phosphoryl chloride and magnesium chloride as a catalyst were added in the reactor simultaneously. Condenser and temperature probes were set above the reactor, and a gas inlet was connected to the condenser for introducing the hydrochloride gas into the neutralization tank.

The heating temperature of the first stage of esterification reaction is at the range between 60 and 120° C., and under normal pressure. The major product is a mono-substituted (n=1) compound, with a minor product of di-substituted (n=2) compound. The reaction scheme is as described in scheme (1); the preferable temperature is between 100 and 110° C.; four hours later, distillation was carried out under reduced pressure (30~40 mmHg) to recover the excessive phosphoryl chloride; the phosphoryl chloride would cease to exist after two hours; the reaction temperature was cooled to room temperature; an equivalent of ortho-alkylphenolic compound and twice equivalents of the organic base were added for carrying out the second stage of esterification reaction; the reacting temperature was controlled in the range between 80 and 140° C., preferably between 110 and 120° C., for one hour; an equivalent of HEMA was then added to perform the third stage of esterification reaction; the reacting temperature was controlled between 70 and 140° C., preferably between 110 and 120° C., for one hour; all three stages of esterification reaction were measured for completion by $^{31}$P nuclear resonance spectroscopy.

After the completion of all reactions, the product compound was dissolved in organic solvents; the organic base salt was filtered out first and the residual hydrochloride salts of organic base were then converted to ammonium chloride with a small amount of ammonia gas; ammonium chloride is then filtered out and the organic solvent is recovered by distillation, and the acrylophosphate compound can be obtained.

After the completion of the first stage of esterification reaction and the recovery of phosphoryl chloride, organic base, solvents and four equivalents of HEMA can be added to prepare the acrylophosphate containing four functional groups, as described in scheme (2).

More detailed examples are used to illustrate the present invention, and these examples are used to explain the present invention. The examples below, which are given simply by way of illustration, must not be taken to limit the scope the invention.

PREPARATION EXAMPLE 1

Preparation of Compound of Formula (II-1)

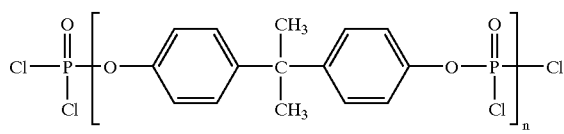

(II-1)

114 g (0.5 mole) of bisphenol A, 460 g(3.0 mole) of phosphoryl chloride and 1.8 g of magnesium chloride as a catalyst were added into reactor. A condenser and temperature probes were set above the reactor, and the temperature of the condenser is controlled at 0° C. A gas inlet is connected to the condenser to introduce the hydrochloride gas into the neutralization tank.

The reaction starts when the temperature of the reacting liquid is approximately around 65° C., with the temperature being maintained at 100 to 110° C. After about one hour, the reaction rate slowed down. Four hours later, the reaction was almost complete and then underwent reduced pressure distillation under 30~40 mmHg for two hours. The un-reacted phosphoryl chloride was then recovered. The product compound was analyzed by $^{31}$P nuclear resonance spectroscopy, wherein the integral of mono-substituted (n=1) intermediate compound and di-substituted (n=2) intermediate compounds is 95:5; the total weight of products is 223 g, which is close to the theoretical value 222.6 g, and thus showing an approximate 100% conversion.

PREPARATION EXAMPLE 2

Preparation of Compound of Formula (II-2)

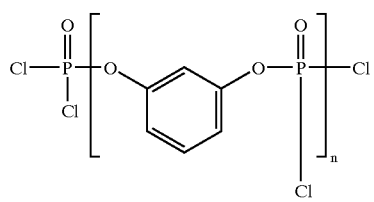

(II-2)

resorcinol 55 g (0.5 mol), phosphoryl chloride 460 g (3.0 mol), and the catalyst magnesium chloride 1.8 g were added and the same procedure as in Example 1 was repeated. The product compound was analyzed by $^{31}$P nuclear resonance spectroscopy, wherein the integral of mono-substituted (n=1) intermediate compounds and di-substituted (n=2) intermediate compounds is 96:4; the total weight of products is 165.5 g, which is close to the theoretical value 165.2 g, thus proving an approximate 100% conversion.

PREPARATION EXAMPLE 3

Preparation of Compounds of Formula (II-3) and (II-4)

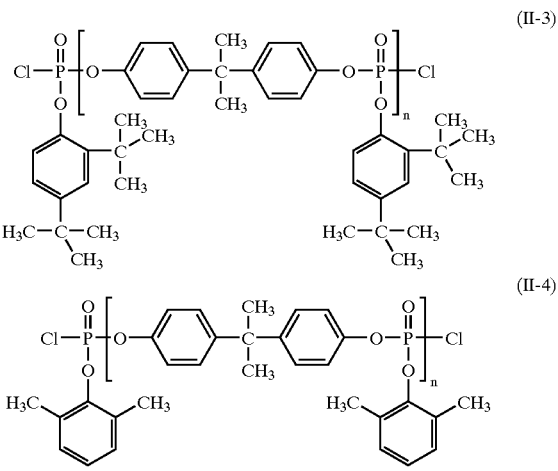

Continue with the intermediate compound (II-1) from Example 1, 2,4-di-tert-butyl phenol 188 g (0.91 mol, calculated from the relative integral) or 2,6-dimethyl phenol 111 g (0.91 mol), and pyridine 158 g (2 mol) as organic base, were added; using water in the condenser and reaction temperature was maintained between 110 and 120° C. for 1 hour. The product was analyzed by $^{31}$P nuclear resonance spectroscopy and confirmed the completion of the reaction. The selectivity of each is 90% and 80% upward.

PREPARATION EXAMPLE 4

Preparation of Compounds of Formula (II-5) and (II-6)

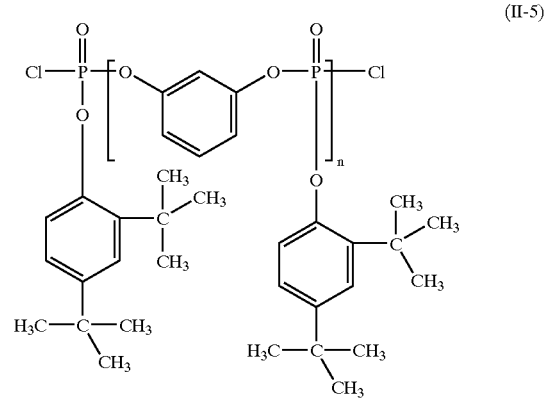

-continued

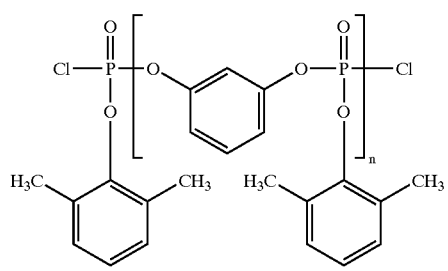
(II-6)

Continuing with the intermediate compound (II-2) obtained from Example 2 and carrying on the second stage of esterification reaction; 2,4-di-tert-butyl phenol 190 g (0.92 mol) or 2,6-dimethyl phenol 112.3 g (0.92 mol) was added. The selectivity of each detected by $^{31}P$ nuclear resonance spectroscopy is 90% and 80% upward.

PREPARATION EXAMPLE 5

Preparation of Compounds of Formula (I-1) and (I-2)

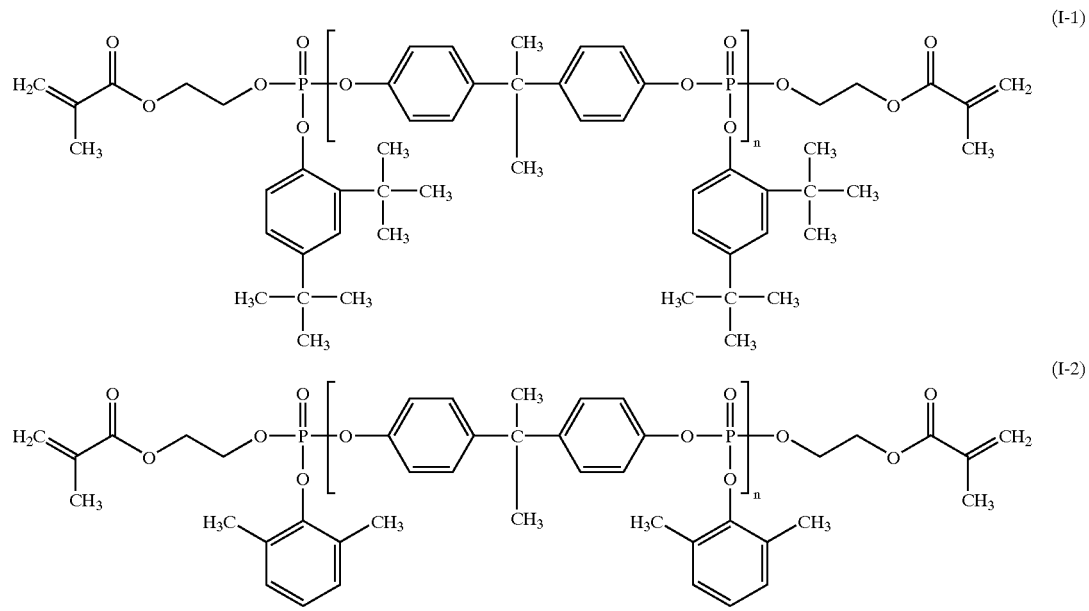

The BBC and BMC obtained from the two-stage esterification reaction were then cooled down to room temperature; HEMA (2-hydroxyethylmethacrylate) 123.5 g (0.95 mol) was added to both compounds and stirred and heated to 100° C. Analyzed after 1 hour by $^{31}P$ nuclear resonance spectroscopy and confirmed the completion of reaction.

PREPARATION EXAMPLE 6

Preparation of Compounds of Formula (I-4) and (I-5)

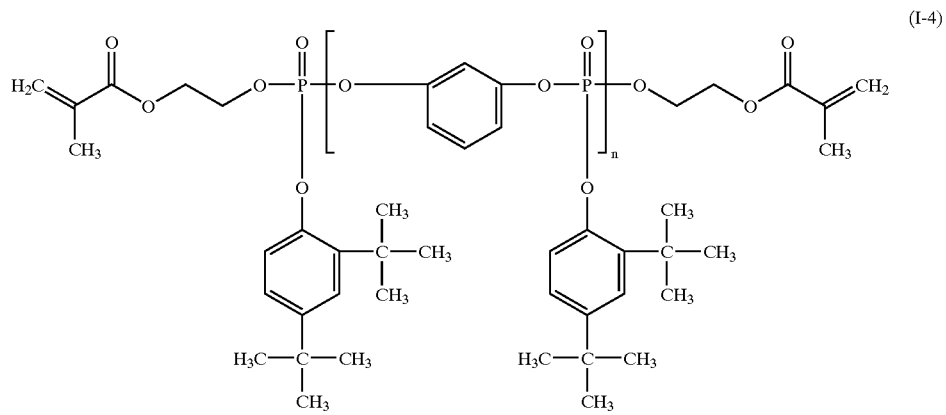

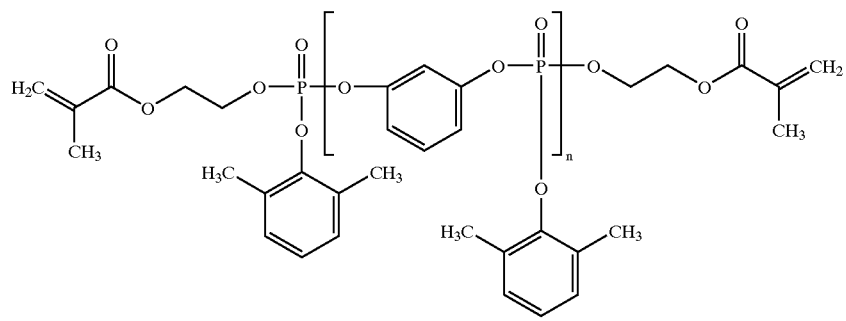

(I-5)

The compounds (II-5) and (II-6) obtained from the two-stage esterification reaction were then cooled down to room temperature; HEMA (2-hydroxyethylmethacrylate) 124.8 g (0.96 mol) was added to both compounds and stirred and heated to 100° C. Analyzed after 1 hour by $^{31}$P nuclear resonance spectroscopy and confirmed the completion of reaction.

PREPARATION EXAMPLE 7
Preparation of Compounds of Formula (I-3) and (I-6)

ice bath. After stirring for 1 hour, the solution was analyzed by $^{31}$P nuclear resonance spectroscopy and confirmed the completion of reaction.

PREPARATION EXAMPLE 8
Purification and Test

The compounds of formula (I-1), (I-2), (I-4) and (I-5) obtained from the esterification reaction were dissolved in 500 ml toluene or ethyl acetate. After filtration of precipitate,

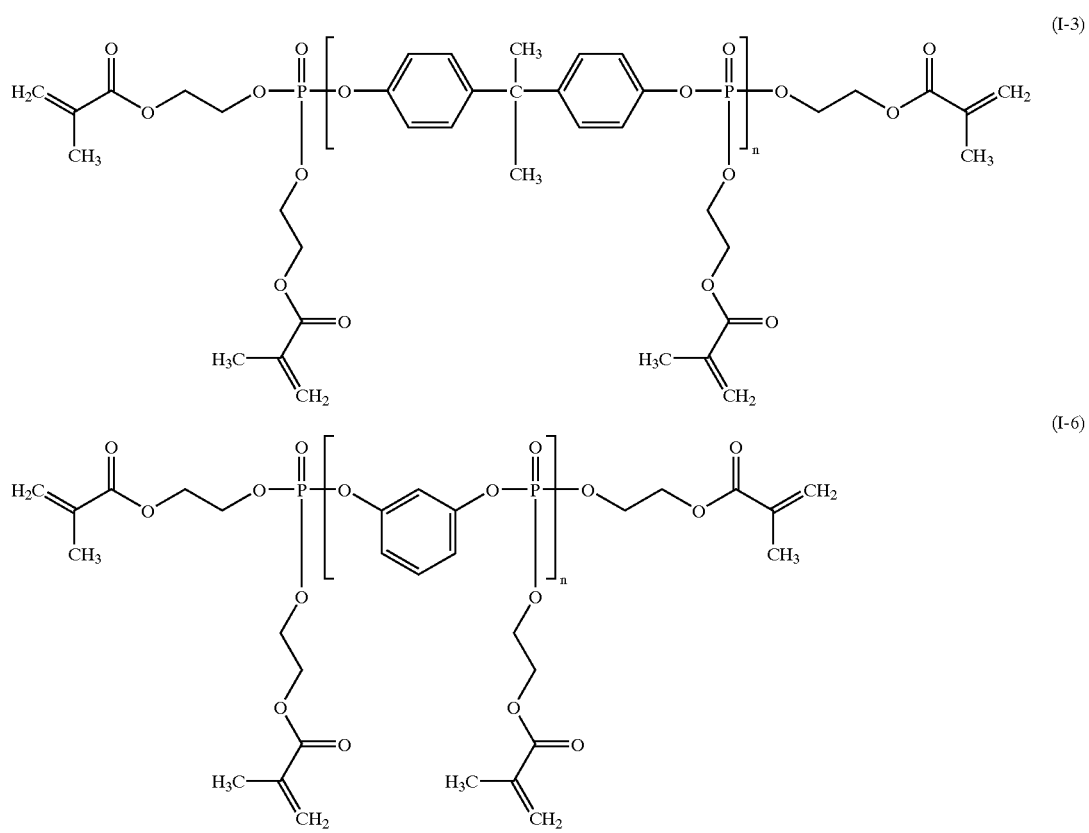

Based on the relative integral, HEMA 241.8 g (1.86 mol) or 245.7 g (1.89 mol) was added to the intermediate compounds BDC and RDC obtained from the first stage of esterification reaction and then dissolved into 500 ml ethyl ether or dichloromethane; an equivalent of triethylamine 188 g or 190 g was added into the above solution dropwise in an ammonia was introduced into the solution and the ammonium chloride byproduct was then filtered out. After recovering the solvent, the purified product compound was obtained. In the case of formula (I-3) and (I-6), the triethylamine hyrochloride was filtered first and then the solvent was recovered.

Six acrylophosphate compounds were tested by TGA and the results are listed in the table below.

TABLE 1

| compound | TGA results | | | |
|---|---|---|---|---|
| | 200° C. residue (%) | 300° C. residue (%) | 400° C. residue (%) | 600° C. residue (%) |
| (I-1) | 95 | 67 | 26 | 12 |
| (I-2) | 96 | 84 | 35 | 26 |
| (I-3) | 96 | 92 | 50 | 39 |
| (I-4) | 92 | 80 | 27 | 19 |
| (I-5) | 97 | 90 | 42 | 31 |
| (I-6) | 97 | 93 | 60 | 44 |

The $^{31}$P chemical shifts of the compounds of the present invention are listed in Table 2 below.

TABLE 2

$^{31}$P chemical shift

| Formula | Formula | $^{31}$P chemical shift |
|---|---|---|
| [structure] | (II-1) | 4.5 ppm (n = 1) −4.2 ppm & 4.5 ppm (n = 2) |
| [structure] | (II-2) | 2.8 ppm (n = 1) −6.5 ppm & 2.8 ppm (n = 2) |
| [structure] | (II-3) | −5.8 ppm (n = 1) −17.4 ppm & −5.8 ppm (n = 2) |
| [structure] | (II-4) | −5.6 ppm (n = 1) −17.2 ppm & −5.6 ppm (n = 2) |

TABLE 2-continued $^{31}$P chemical shift

| Formula | Formula | $^{31}$P chemical shift |
|---|---|---|
| (structure) | (II-5) | −7.0 ppm (n = 1) −18.6 ppm & −7 ppm (n = 2) |
| (structure) | (II-6) | −4.8 ppm (n = 1) −16.8 ppm & −4.8 ppm (n = 2) |
| (structure) | (I-1) | −11.7 ppm (n = 1) −18.2 ppm & −11.7 ppm (n = 2) |
| (structure) | (I-2) | −11.0 ppm (n = 1) −16.2 ppm & −11.0 ppm (n = 2) |

TABLE 2-continued $^{31}$P chemical shift

| Formula | Formula | $^{31}$P chemical shift |
|---|---|---|
| (structure) | (I-3) | −5.9 ppm (n = 1) −11.1 ppm & −5.9 ppm (n = 2) |
| (structure) | (I-4) | −12.2 ppm (n = 1) −18.6 ppm & −12.2 ppm (n = 2) |
| (structure) | (I-5) | −11.4 ppm (n = 1) −16.8 ppm & −11.4 ppm (n = 2) |
| (structure) | (I-6) | −6.2 ppm (n = 1) −11.9 ppm & −6.2 ppm (n = 2) |

Although the invention is illustrated and described herein, it is nevertheless not intended to be limited to the details shown, since various modifications may be made therein without departing from the invention and within the scope and range of equivalents of the claims.

What is claimed is:

1. An acrylophosphate derivatives of the formula (I)

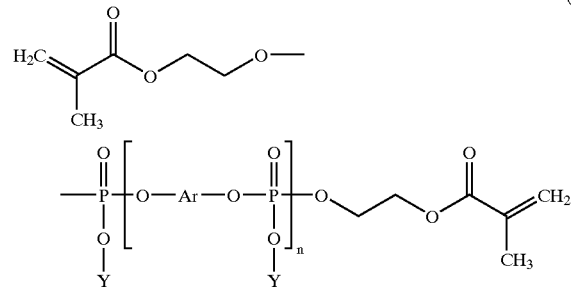

wherein n=1, 2, or 3;

Ar is 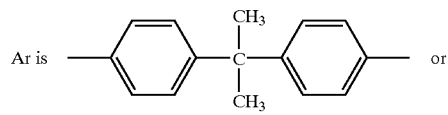 or

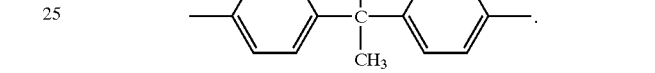

Y is 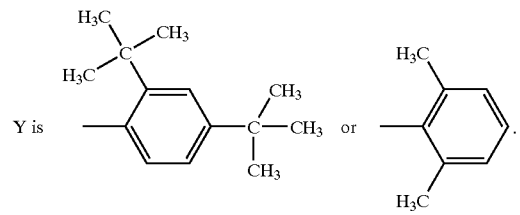 or 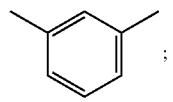

2. The acrylophosphate derivatives of claim 1, wherein said Ar is

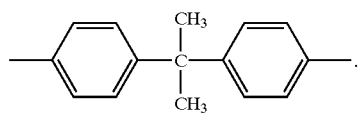

3. The acrylophosphate derivatives of claim 2, wherein said acrylophosphate derivative is the compound of formula (I-1):

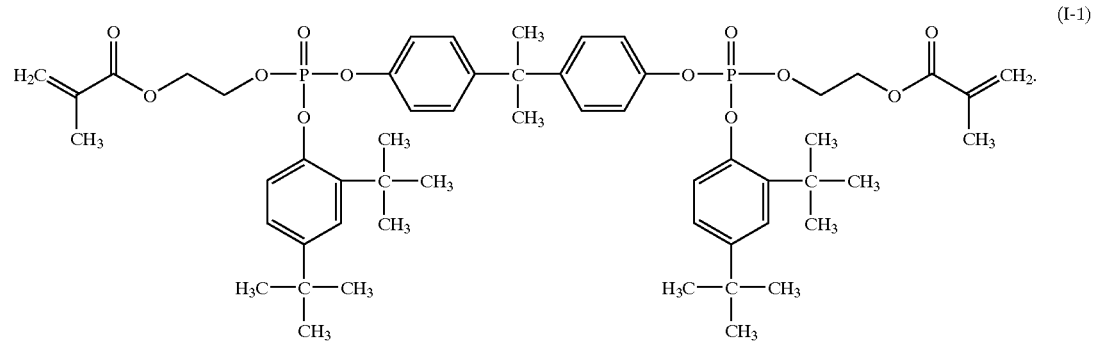

4. The acrylophosphate derivatives of claim 2, wherein said acrylophosphate derivative is the compound of formula (I-2):

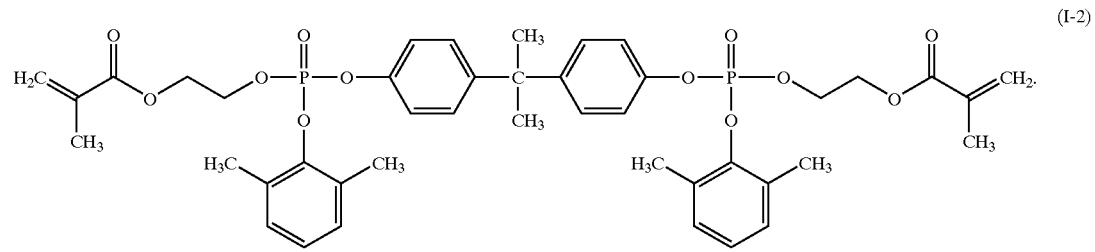

5. The acrylphosphate derivatives of claim 1, wherein said Ar is
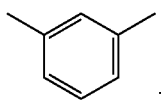
6. The acrylophosphate derivatives of claim 5, wherein said acrylophosphate derivative is the compound of formula (I-4):
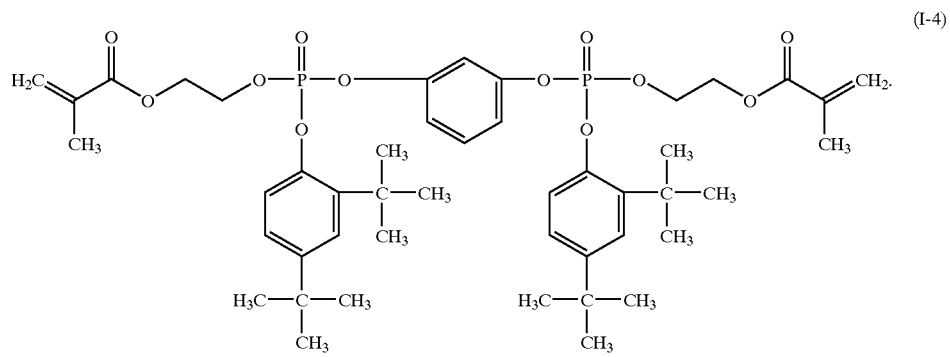
7. The acrylophosphate derivatives of claim 5, wherein said acrylophosphate derivative is the compound of formula (I-5):
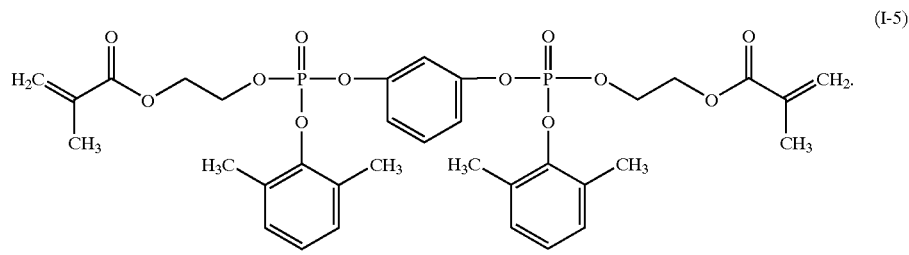
* * * * *